United States Patent [19]

Paton

[11] Patent Number: 4,979,595

[45] Date of Patent: Dec. 25, 1990

[54] FLUID ACTUATED FRICTION DAMPER

[76] Inventor: H. Neil Paton, 1460 Elliott Ave. West, Seattle, Wash. 98119

[21] Appl. No.: 309,846

[22] Filed: Feb. 14, 1989

[51] Int. Cl.[5] .............................................. F16F 7/08
[52] U.S. Cl. ..................................................... 188/129
[58] Field of Search ............... 188/129, 130, 366, 367; 16/82; 213/37; 267/134

[56] References Cited

U.S. PATENT DOCUMENTS

| | | | |
|---|---|---|---|
| 2,608,275 | 8/1952 | Hobbs | 188/366 |
| 2,715,952 | 8/1955 | Barnett . | |
| 2,869,685 | 1/1959 | Funkhouser et al. . | |
| 2,928,507 | 3/1960 | Thompson . | |
| 2,940,552 | 6/1960 | Freyler . | |
| 3,054,478 | 9/1962 | Rumsey . | |
| 3,807,668 | 4/1974 | Whitener . | |
| 3,972,540 | 8/1976 | Donaldson | 188/129 X |
| 4,805,744 | 2/1989 | Pringle | 188/366 X |
| 4,809,179 | 2/1989 | Klinger et al. | 280/707 X |

FOREIGN PATENT DOCUMENTS

| | | | |
|---|---|---|---|
| 1430178 | 3/1984 | Fed. Rep. of Germany . | |
| 1185834 | 2/1959 | France | 188/129 |

Primary Examiner—George E. A. Halvosa
Attorney, Agent, or Firm—Finnegan, Henderson Farabow, Garrett & Dunner

[57] ABSTRACT

The fluid actuated friction damper comprises a cylinder and an expandable piston assembly made up of a piston having two spaced apart parallel end walls which form an annular chamber, and two spaced apart side walls which project toward one another and terminate in two spaced apart parallel edges. These edges define a curved opening for the chamber which fronts upon the inside of the cylinder. A curved friction member is located between these edges in this opening, and is pressed against the inside of the cylinder by an underlying flexible actuator ring. This ring has a width greater than the spacing between the side wall edges and is located inside of the side walls so that the ring simultaneously self-seals against the side walls and bulges outwardly through the opening, thereby pressing the friction member against the inside of the cylinder when the chamber is pressurized. The friction member is contained in a fixed position with respect to the piston between the side wall edges, the inside of the cylinder and the flexible actuator ring. The frictional damping force obtained is controllable in relation to the direction of movement of the piston assembly within the cylinder, either by control of the fluid pressure applied to the chamber, or by control of the surface area of the actuator ring exposed to a single fluid pressure, using fluid pressure less than 35 psi.

7 Claims, 3 Drawing Sheets

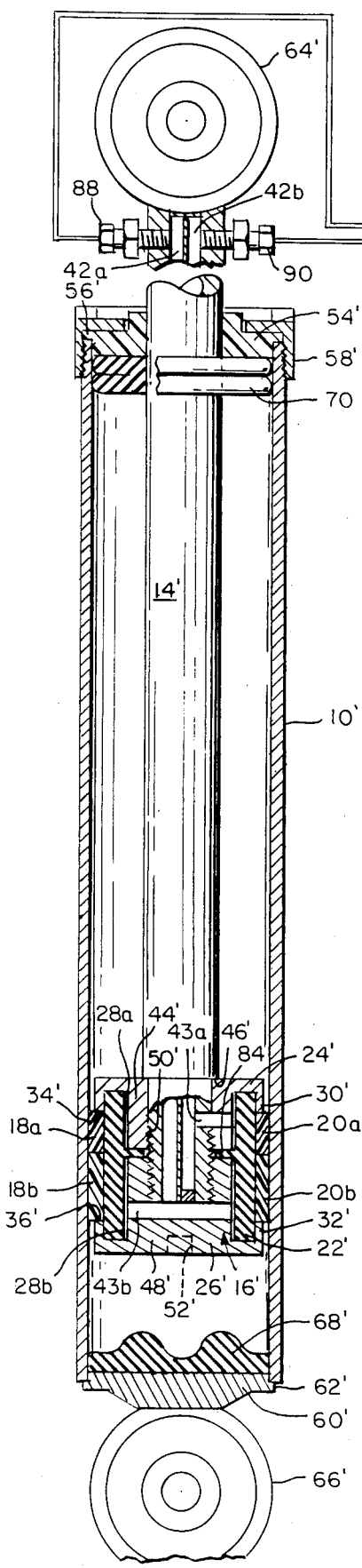
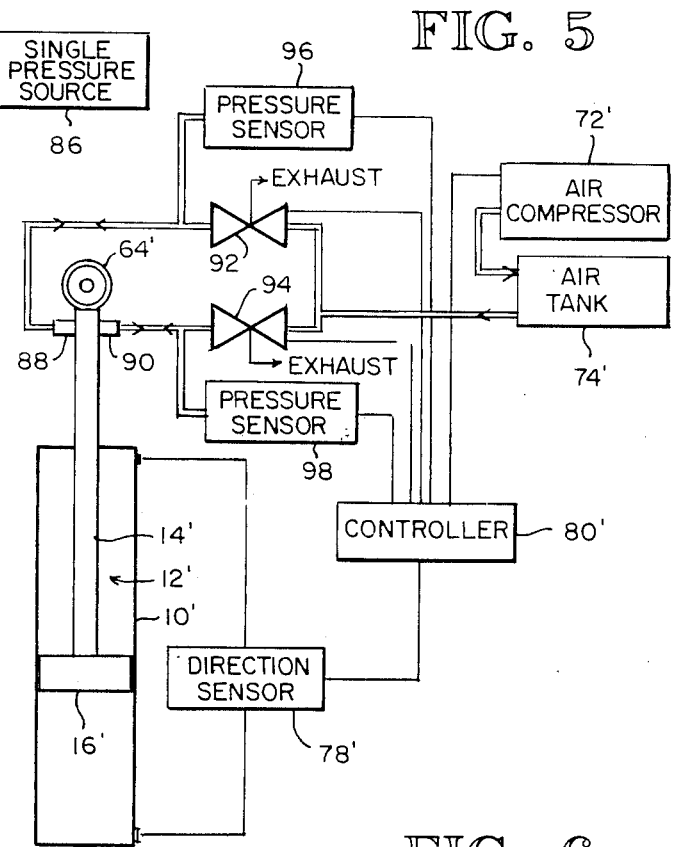
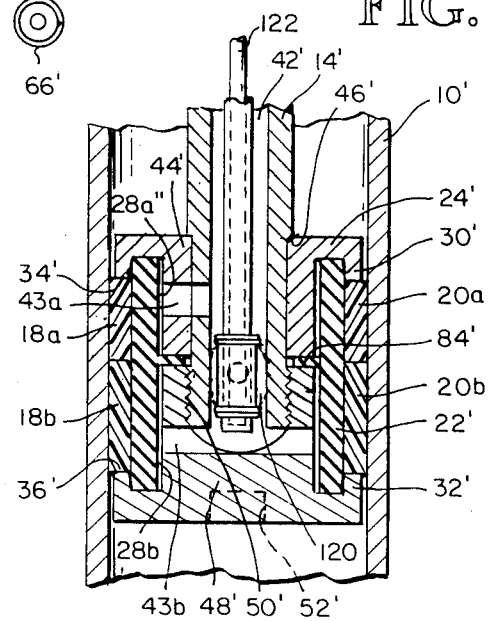
FIG. 4
FIG. 5
FIG. 6

FLUID ACTUATED FRICTION DAMPER

BACKGROUND OF THE INVENTION

This invention relates to friction dampers and, more particularly, to friction dampers in which the frictional damping force obtained is controllable.

Most friction dampers of this type provide control of the frictional damping force obtained by selective adjustment of the normal force applied to one or more friction members which rub against one of two or more relatively movable members. This adjustment typically is accomplished by selective wedging of the friction members against one of the movable members by a jack screw, spring or shim which, once set, applies a constant normal force to the friction members In many applications, however, it is desirable to vary the frictional damping force obtained in relation to a desired environmental parameter. Some automotive suspensions, for example, vary the frictional damping force obtained in relation to the load applied to a strut or to the pressure inside of a gas spring. Certain aircraft landing gear also do so, but in relation to the velocity of movement of an oleo strut. Some of these devices use fluid pressure to actuate the friction members.

The fluid pressure actuated friction dampers most commonly used in such devices include inflatable bladders or folded membranes to control the normal force applied to the friction member or members, and hence the frictional damping force obtained. These tend to be unsatisfactory. The bladder or membrane must be folded back upon itself and therefore requires complex sealing and positioning devices to maintain it in the proper alignment with the friction members.

As the friction members wear away, moreover, this alignment tends to degrade as the bladder or membrane bulges more and more to take up the attendant slack. In extreme cases, the folds can become so misaligned that the fluid seal may be lost. Further, as the fluid pressure increases, so do the chances of a seal failure. This is especially true in those devices which are used with gas springs, since they typically must operate at pressures of 100–125 pounds per square inch (psi).

SUMMARY OF THE INVENTION

A principal object of this invention is to provide a fluid actuated friction damper in which the fluid actuator need not be a bladder or folded membrane, thus is of simple, low cost design and construction, and hence eliminates or minimizes the risk of a fluid seal failure.

Another object of this invention is to provide a fluid actuated friction damper in which the fluid actuator is self-sealing in response to application of fluid pressure, without any supplemental sealing or positioning means.

Another object of this invention related to those just stated is to provide a fluid actuated friction damper in which the fluid actuator and one or more friction members are carried and positioned by a simple housing or piston construction.

Another object of this invention is to provide a fluid actuated friction damper in which the fluid actuator is responsive to fluid pressures less than those commonly used in gas springs.

Another object of this invention is to provide a fluid actuated friction damper in which the frictional damping force obtained is controllable in relation to extension and contraction of the friction damper under rebound conditions or jounce conditions, or both.

Another object of this invention is to provide a fluid actuated friction damper in which the frictional damping force obtained is controllable either by controlling the fluid pressure applied to, or the area of, a fluid actuator in relation to extension and contraction of the friction damper under rebound conditions, or jounce conditions, or both.

Another object of this invention is to provide a fluid actuated friction damper in which the different pressures that occur at opposite ends of a closed-ended cylinder, or adjacent one face of a piston, while the piston moves in and out of the cylinder, are used as a basis to sense the direction of movement of the piston for controlling the frictional damping force obtained.

These objects are accomplished in accordance with the principles of this invention by providing a friction damper comprising a cylinder and an expandable piston assembly which is movable in and out of the cylinder. The piston assembly includes a shaft having one end projecting out of one end of the cylinder, a hollow piston supported by the other end of the shaft, a curved friction member carried by the piston, and fluid actuator means acting between the piston and the friction member for pressing the friction member against the inside of the cylinder in response to fluid pressure inside the piston. This fluid pressure preferably, is, but need not be, applied through a bore formed in the shaft.

The piston includes two spaced apart parallel end walls which form a chamber facing the inside of the cylinder, and two spaced apart side walls which respectively project from the end walls toward one another and terminate in two spaced apart parallel edges These edges define a curved opening for the chamber which fronts upon the inside of the cylinder. The friction member has an outline which registers with this opening, and is located in this opening between the side wall edges.

The fluid actuator means includes a flexible actuator ring which has a width greater than the spacing between the side wall edges, and is located inside of the side walls so that it simultaneously self-seals against the side walls and bulges outwardly through the chamber opening, thereby pressing the friction member against the inside of the cylinder, when the chamber is pressurized. The friction member is contained in a fixed position with respect to the piston between the side wall edges, the inside of the cylinder and this ring. One, two, three, four or more curved friction members may be used.

According to further principles of this invention, the fluid actuator means are further operative to control the frictional damping force applied to the inside of the cylinder by the friction member in relation to the direction of movement of the piston inside of the cylinder. While preferably the frictional damping force obtained is greater during extension of the piston, or under rebound conditions, than the frictional damping force obtained during contraction of the piston, or under jounce conditions, the opposite frictional damping force differential may be obtained.

According to a first presently preferred embodiment of the present invention, such control is accomplished by applying two fluid pressures to the chamber, and hence to the inside of the actuator ring, in alternate sequence. In those applications in which the frictional damping force obtained under rebound conditions should be greater than that obtained under jounce conditions, the fluid pressures thus applied are correspondingly differentiated.

According to a second presently preferred embodiment of this invention, such control is accomplished by isolating the inside surface area of the actuator ring into two sections, and exposing only one or both sections to a single fluid pressure in alternate sequence. Under conditions where a lower frictional damping force is required (e.g., under jounce conditions) only one section is exposed to the fluid pressure. Under other conditions in which a higher frictional damping force is required (e.g., under rebound conditions), however, both sections are exposed to the fluid pressure simultaneously.

According to further principles of this invention, the cylinder is closed at each end so that the piston divides it into two pressure chambers, the volumes of which vary as the piston moves in and out of the cylinder under jounce and rebound conditions. By connecting these chambers, fluid will flow between them in opposite directions during such movement of the piston. This fluid flow reflects, and thus may be used as a basis for sensing, the direction of movement of the piston for purposes of effectuating control of the frictional damping force obtained, as just described.

According to still further principles of this invention, the fluid pressures used may be substantially less those commonly used in gas springs and may even be as low as pressures commonly used in passenger car tires (e.g., less than 35 psi). This is accomplished by minimizing the volume of the fluid chamber and providing an actuator ring which is responsive to very small changes in fluid pressure. Consequently, the risk of seal failure is mitigated or eliminated. In addition, the fluid actuator thus obtained is sensitive to small pressure changes, and hence is suitable for use with digital control systems These and other features, objects and advantages of the present invention will become apparent from the detailed description and claims to follow, taken in conjunction with the accompanying drawings in which like parts bear like reference numerals.

BRIEF DESCRIPTION OF THE DRAWINGS

FIG. 4 is a longitudinal section of another presently preferred embodiment of the fluid actuated friction damper of the present invention, depicting control of the frictional damping force obtained by variable pressure areas;

FIG. 5 is a schematic depicting an exemplary fluid circuit for the single pressure source of the FIG. 4 friction damper;

FIG. 6 is a fragmentary longitudinal section, in enlarged scale, of a modified pressure area control for the FIG. 4 friction damper;

DETAILED DESCRIPTION OF THE DRAWINGS

Figure 1:
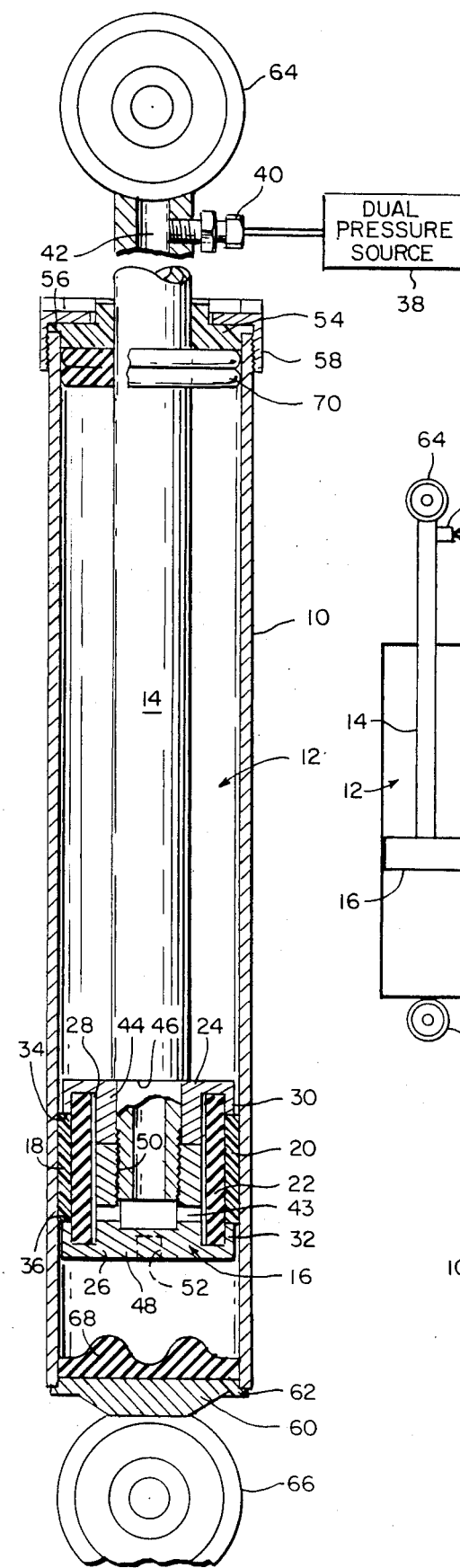
FIG. 1 is a longitudinal section of one presently preferred embodiment of the fluid actuated friction damper of the present invention, depicting control of the frictional damping force obtained by variable fluid pressures.
Figure 2:
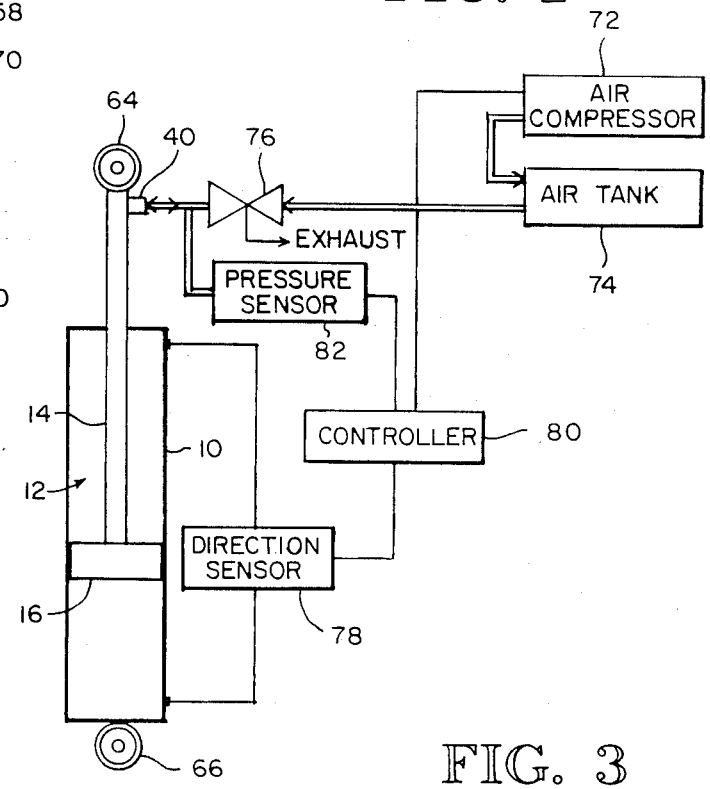
FIG. 2 is a schematic depicting an exemplary fluid circuit for the dual pressure source of the FIG. 1 friction damper.

Referring to FIGS. 1 and 2, one presently preferred embodiment of the present invention comprises a cylinder 10 and an expandable piston assembly (generally referenced by number 12) which is movable in and out of cylinder 10. Assembly 12 includes a hollow shaft 14 having one end projecting out of one end of cylinder 10, a hollow piston (generally referenced by numeral 16) supported by the other end of shaft 14, four curved friction members (only two of which are illustrated and are referenced by numerals 18 and 20, respectively) carried by piston 16, and an actuator ring 22 acting between piston 16 and friction members 18 and 20 for pressing friction members 18 and 20 against the inside of cylinder 10 in response to fluid pressure applied through shaft 14, as will be described presently.

All of the friction members, including those not illustrated, are identical. Each extends about one quarter of the internal circumference of cylinder 10. Together they extend end-to-end along and register with the inside of cylinder 10. For sake of brevity, the friction members not illustrated will not be described further, and the description to follow will refer only to members 18 and 20.

Piston 16 includes two spaced apart end walls 24 and 26 which form an annular chamber 28 facing the inside of Cylinder 10. Piston 16 further includes two spaced apart annular side walls 30 and 32 which respectively project from the outer edges of end walls 24 and 26 toward one another and terminate in two spaced apart parallel edges 34 and 36. These edges define a curved opening for chamber 28 which fronts upon the inside of cylinder 10. Each of the friction members 18 and 20 has an outline which registers with this opening, and is located in this opening between edges 34 and 36. Friction members 18 and 20 are contained in a fixed position with respect to piston 12 between edges 34 and 36, the inside of the cylinder 10, and the actuator ring 22.

Actuator ring 22 has a width greater than the space in between edges 34 and 36, and is located inside of or beneath the side walls 30 and 32. Consequently, actuator ring 22 simultaneously self-seals against side walls 30 and 32, and bulges outwardly through the opening between edges 34 and 36, thereby pressing friction members 18 and 20 against the inside of the cylinder 10, when chamber 28 is pressurized, as will be described presently.

A dual pressure source (generally referenced by number 38) provides a first fluid pressure and a second fluid pressure in alternate sequence. Pressure fluid is transmitted from source 38 to chamber 28 via a pressure fitting 40 and a bore 42, which extends along the entire length of shaft 14, and a transverse passage 43 formed by piston 16.

Still referring to FIG. 1, piston 16 further includes two housing sections, an inner section 44 which fits over and abuts against an enlarged diameter shoulder 46 formed by shaft 14, and an outer section 48 which is threaded onto the inner end of shaft 14. When tightened down onto threads 50, section 48 thus secures section 44 onto the inner end of shaft 14. Section 48 includes two diametrically spaced apart recesses 52 (one not shown) within which a suitable tightening tool (not shown) may be engaged to turn and so tighten section 48 onto the inner end of shaft 14.

The piston assembly 12 thus formed is guided and supported with respect to cylinder 10 at both ends. At its outer end, assembly 12 is supported and guided by a bearing 54 which, in the example, is made up of a suitable low friction material. Bearing 54 has a peripheral lip 56 which fits over and is pressed down upon the end of cylinder 10 by a threaded retaining collar 58. Collar 58 screws onto the outer end of cylinder 10, as shown (FIG. 1). When thus assembled, lip 56 positions bearing 54 with respect to cylinder 10, and also seals the end of cylinder 10.

At its inner end, assembly 12 is supported and guided by friction members 18 and 20 which alternately act as bearings and as sources of frictional damping force, in response to the application of fluid pressure to chamber 28, as will be described. To serve these purposes, therefore, friction members 18 and 20 preferably are made up of a suitable low friction material.

The opposite end of cylinder 10 is closed by a closure member 60, which, in the example, is or may be of material comparable to that used to form bearing 54. Like bearing 54, member 60 has a peripheral lip 62 which fits over and seals the associated end cylinder 10. Member 60 is, however, press fit into this end, although a retaining collar generally similar to collar 58 could be used for positive securement, if desired.

In the example, two collars 64 and 66 respectively project outwardly from the outer end of shaft 14 and member 60. These are suitable for mounting the friction damper between the sprung and unsprung masses of the vehicle or other structure involved.

A rubber jounce stop 68 is mounted by the inside face of member 60 for engaging section 48 and stopping contraction of assembly 12 under extreme jounce conditions. To this end, stop 68 is formed with an upstanding ring portion which further cushions and stops assembly 12 upon contact with it. Likewise, a rebound stop 70 is mounted by the inside face of bearing 54 for engaging section 44 and stopping extension of assembly 12 under extreme rebound conditions. In the example, both the jounce and rebound stops 68 and 70 are made up of a suitable elastomer material.

Referring again more specifically to the FIG. 1 actuator ring 22, this part is composed of a suitable material which is both flexible and is impervious to the pressure fluid used to pressurize chamber 28. In the example, air is used as the pressure fluid and actuator ring 22 is composed of elastomer.

The thickness of actuator ring 22 is selected in relation to the desired volume of chamber 28. In the example, actuator ring 22 has a thickness slightly less than the radial spacing between side walls 30 and 32 and the opposed surfaces of sections 44 and 48, thus leaving only a thin fluid space for chamber 28. It will be recognized that, by thus minimizing the volume of chamber 28, it is possible to obtain very rapid changes in the fluid pressure within chamber 28. This is particularly important in certain automotive or other active suspension applications in which it is desired to vary the fluid pressure, and hence the frictional damping force obtained, in response to rapidly changing dynamic conditions.

The width of actuator ring 22 corresponds to the spacing between end walls 24 and 26, and hence is substantially greater than the spacing between edges 34 and 36. Consequently, the edges of actuator ring 22 which fit inside of side walls 30 and 32 are self-sealing in response to the application of fluid pressure within chamber 28. In addition, such fluid pressure also causes the midsection of ring 22 to bulge outwardly through the opening formed between edges 34 and 36, against the inside of friction members 18 and 20, thus pressing them against the inside of cylinder 10, in response to application of fluid pressure within chamber 28.

Unlike bladder or folded membrane constructions, actuator ring 22 reacts only outwardly to fluid pressure within chamber 28, and requires no special seal or positioning devices. Further, actuator ring 22 takes up slack caused by wear in the friction members 18 and 20 simply by bulging further. Consequently, actuator ring 22 overcomes or mitigates fears of seal failure which, until this invention, were associated with most fluid actuated friction dampers.

Referring now to FIG. 2, one presently preferred embodiment of the dual pressure source 38 (FIG. 1) is made up of an air compressor 72 and an air tank 74 for storing fluid pressure generated by compressor 72. Pressure fluid from tank 74 is supplied via a three way value 76 to fitting 40. A direction sensor 78 senses the direction of movement of assembly 12 with respect to cylinder 10 and provides an input signal to a suitable controller 80. A pressure sensor 82 senses the pressure which appears at the outlet of valve 76, and provides an input signal to controller 80 which reflects the fluid pressure within chamber 28. Sensor 78 will be described later in more detail. Sensor 82 is or may be a suitable pressure sensor. Controller 80 is or may be a suitable microprocessor.

In the example illustrated in FIGS. 1 and 2, fluid pressure within chamber 28 is controllable so that the frictional damping force obtained is greater during extension of assembly 12 under rebound conditions than it is during contraction of assembly 12 under jounce conditions. This is achieved by providing a first, relatively higher, fluid pressure from air tank 74 via valve 76 so long as assembly 12 is stationary or is being extended within cylinder 10.

When assembly 12 moves in a contractive direction, sensor 78 presents a signal indicative of contraction of assembly 12 to controller 80, which thereupon causes valve 76 to open, and thus exhaust fluid pressure in chamber 28 until sensor 82 determines that the fluid pressure in chamber 28 has dropped to a second, relatively lower, level. This condition then is maintained until sensor 78 determines that contractive movement of assembly 12 has ceased.

Sensor 78 then delivers an appropriate signal to controller 80, whereupon controller 80 causes valve 76 to return to its first position, so that the full fluid pressure can be restored in chamber 28. Controller 80 thus causes compressor 72 to increase air pressure within air tank 74 back to the first, relatively higher level, and hence restores the pressure in chamber 28 via valve 76 and shaft 14.

Figure 3:
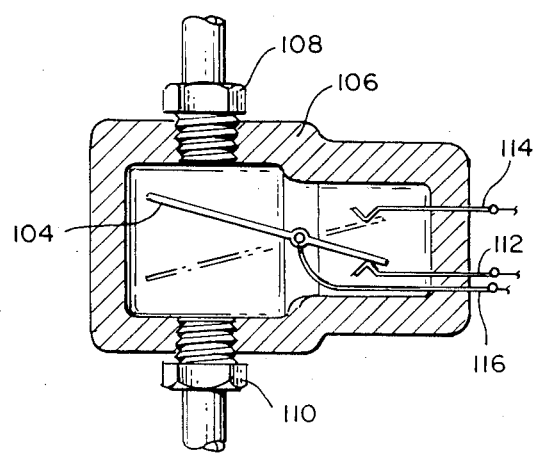
FIG. 3 is a longitudinal section of one presently preferred direction sensor for the FIG. 2 fluid circuit.

Referring to FIG. 3, one presently preferred direction sensor 78 (FIG. 2) includes a vane 104 which is pivotly supported within a housing 106. This housing includes two fluid ports 108 and 110, which are connected, respectively, to the opposite ends of the cylinder 10, as shown (FIG. 2). Vane 104 projects into and swings in the direction of fluid flow between ports 108 and 110. Since the ends of cylinder 10 are closed, extension or contraction of the assembly 12 forces pressure fluid from the end toward which assembly 12 is moving to the opposite end.

As pressure fluid thus flows through housing 106, vane 104 swings in the direction of flow, opposite to the direction of movement of assembly 12. As depicted in solid and broken lines, vane 104 alternately makes contact with electrical contacts 112 and 114, depending on the direction of fluid flow. The electrical contact thus made completes a circuit through a common 116, and thus provides an electrical signal to the controller 80 (FIG. 2), reflecting the direction of movement of assembly 12. Appropriate magnetic or other proximity sensors could be substituted for the electrical contact points depicted in FIG. 3.

It will be recognized that other direction sensors could be used in place of that illustrated in FIG. 3. For example, a diaphragm switch made up of a diaphragm which is displaceable in relation to the direction of pressure fluid flow could be used to operate controller 80 or an intermediate solenoid valve. Likewise, a restricted orifice device which provides a pressure pulse to an air pilot valve during either rebound or jounce conditions, or both, could be provided. In this case, the direction sensor could provide a pressure pulse which directly triggers valve 76 (FIG. 2) upon the occurrence of the selected condition.

Referring now to FIGS. 4-6, a second presently preferred embodiment of the present invention, unlike the embodiment just described, provides control of the frictional damping force obtained by controlling the surface area of the actuator ring exposed to a single fluid pressure. Except for this difference, this embodiment is generally similar to the FIG. 1-3 embodiment just described. For sake of brevity, therefore, parts illustrated in FIGS. 4-6 corresponding to those illustrated in FIGS. 1-3 will not be described separately, and are designated with the same reference numerals, primed.

Referring now in particular to FIG. 4, the bore inside shaft 14' is divided into two passages 42a and 42b, of equal cross-sectional areas. Unlike actuator ring 22 (FIG. 1), actuator ring 22' has a transverse web 84 which is gripped and compressed between a abutting faces of sections 44' and 48' when section 48' is threaded onto and secured to the inner end of shaft 14', as already described. Web 84 therefore divides chamber 28' into two spaces—an inner space 28a and and outer space 28b. Each of the friction members likewise is divided into two separate sections 18a and 18b, and 20a and 20b. As will be apparent from FIG. 4, these sections abut one another along a line which is aligned with web 84. Spaces 28a and 28b respectively communicate with passages 42a and 42b via transverse passages 43a and 43b. A single pressure source 86 (FIG. 4) is respectively connected via pressure input fittings 88 and 90 to passages 42a and 42b.

The aggregate area of the actuator ring exposed to fluid pressure, and hence the frictional damping force obtained is, in the example, controlled so that the frictional damping force obtained under rebound conditions is greater than that obtained under jounce conditions. Under jounce conditions, only space 28a is pressurized, while under rebound conditions space 28a and space 28b are pressurized simultaneously.

Consequently, the aggregate surface area of sections 18a, 18b, 20a, and 20b exposed to fluid pressure may be varied correspondingly. When only sections 18a and 20a are exposed to fluid pressure within space 28a, essentially only sections 18a and 20a are pressed against the inner surface of cylinder 10'. When spaces 28a and 28b are pressurized simultaneously, however, sections 18a, 18b and 20a and 20b are pressed against the inside of cylinder 10' simultaneously, and so the frictional damping force obtained is increased correspondingly.

The ratio of the frictional damping forces thus obtained under rebound and jounce conditions is, of course, related to the ratio of the aggregate area of sections 18a and 20a to the aggregate area of sections 18a, 18b, 20a and 20b. In the illustrated example this ratio is about 2:1. It will be recognized, however, that this ratio may be varied by increasing or decreasing the aggregate surface area of the friction member sections which remain active when only one space is pressurized.

Referring now to FIG. 5, one presently preferred embodiment of the single pressure source 86 (FIG. 4) is made up of an air compressor 72' and an air tank 74' for storing and maintaining a constant fluid pressure. Unlike the FIG. 2 circuit, however, air tank 74' supplies fluid pressure to two three-way valves 92 and 94 which, in turn, are connected via fittings 88 and 90 and passages 42a and 42b to chambers 28a and 28b, respectively Two pressure sensors 96 and 98 respectively sense the pressures which appear at the outlets of valves 92 and 94, and provide input signals to controller 80' indicative of the fluid pressures in spaces 28a and 28b.

Like the FIG. 2 fluid control circuit, the FIG. 5 fluid circuit supplies fluid pressure so that the frictional damping force obtained normally corresponds to that desired for rebound conditions. That is to say, controller 80' normally causes valves 92 and 94 to supply fluid pressure from tank 74' to passages 42a and 42b simultaneously, thereby pressurizing spaces 28a and 28b simultaneously. This, of course, causes all of the friction members to be pressed against the inside surface of cylinder 10'.

Under jounce conditions, however, sensor 78' detects contractive movement of assembly 12', and delivers an appropriate signal to controller 80'. In the example, controller 80' thereupon causes valve 94 to exhaust the fluid pressure within passage 42a, and hence within space 28b, whereupon the frictional damping force obtained is decreased as already described. When this condition no longer persists as sensed by sensor 78', the frictional damping force is returned to the normal level.

Another construction for pressurizing spaces 28a and 28b in the manner just described is illustrated in FIG. 6. The FIG. 6 construction is generally similar to parts of the FIG. 4 actuator For sake of brevity, therefore, parts of the FIG. 6 construction corresponding to those illustrated in FIG. 4 are not described separately, and are designated with the same reference numerals.

The FIG. 6 fluid actuator includes an expandable collar 120 which is connected to one of the two pressure input fittings 88 or 90 (FIG. 3) via an internal tube 122 which runs the length of bore 42'. Both passage 43a and 43b communicate with bore 42'; however, bore 42' is blocked by collar 120 upstream of passage 43b when collar 100 is expanded to the position illustrated. This is accomplished by supplying fluid pressure via tube 122 under conditions when it is desired to pressurize only chamber 28a. To pressurize both spaces 28a and 28b simultaneously, collar 120 is deflated by exhausting fluid pressure via line 122. This, of course, allows pressure fluid to pass collar 120 and create fluid pressure in space 28b.

Figure 7:
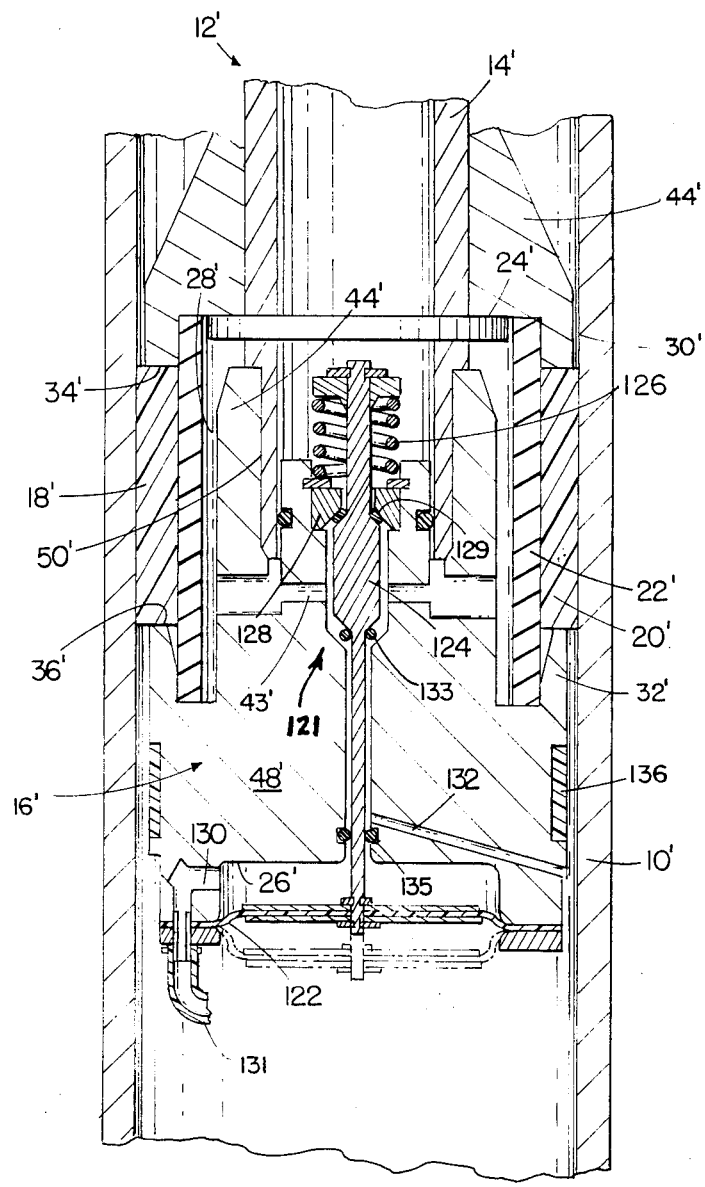
FIG. 7 is a fragmentary longitudinal section, in enlarged scale, of a diaphragm valve for the FIG. 1 friction damper, depicting control of the frictional damping force obtained under rebound conditions.

Referring to FIG. 7, the fluid pressure adjacent the piston may be used to control the FIG. 1 friction damper so that it operates in only one direction. One application of this adaptation is a fluid actuated rebound damper in an automotive suspension strut The FIG. 7 construction is generally similar to parts of the FIG. 1 actuator. For sake of brevity, therefore, parts of the FIG. 7 construction corresponding to those illustrated in FIG. 1 are not described separately, and are designated with the same reference numerals, primed.

The FIG. 7 damper includes a diaphragm valve assembly (generally referenced by numeral 121) which is mounted by housing sections 44' and 48'. Assembly 120 includes a diaphragm 122 which faces the opposed end of cylinder 10', and is displaceable along a line which coincides with the direction of reciprocative movement of assembly 12'. A valve member 124 is movable conjointly with diaphragm 122. A spring 126 normally urges valve 124 to the position illustrated. At this position, valve 124 closes an orifice 128 through which fluid pressure is supplied from single pressure source 86'. An O-ring 129 is pressed against and seals Orifice 128 when valve 124 is in its closed position, as shown (FIG. 7). The upstream side of the diaphragm 122 is vented to atmosphere via a relief port 130. In the example, this relief port is connected, via a flexible tube 131, to atmosphere at a suitable location adjacent the opposed end of cylinder 10'.

A relief passage 132 bleeds fluid pressure from chamber 28', past the stem portion of valve 124 and around the edge of diaphragm 122 to a location downstream of diaphragm 122, but only when valve 124 is open. When closed valve 124 presses an O-ring 133 against section 48' and blocks passage 132 so no pressure fluid can escape from chamber 28'. An O-ring 135 provides a seal about the stem portion of valve 124 downstream of passage 132.

During extension of assembly 12' under rebound conditions, the resultant drop in pressure downstream of diaphragm 122 (or below it as illustrated) causes diaphragm 122 to be displaced to the position depicted in broken lines. Valve 124 then opens orifice 128 to admit fluid pressure to chamber 28'. As will now be appreciated, this causes friction members 18' and 20' to be pressed against the inside of cylinder 10'.

During contraction of assembly 12' under jounce conditions, however, diaphragm 122 remains in the position depicted in solid lines, and spring 126 pulls valve 124 against and thus closes orifice 128. Since fluid pressure now is exhausted from chamber 28' via passage 132 and is not rereplaced by fresh pressure fluid, there is insufficient fluid pressure inside of chamber 28' to deform actuator ring 22' under these conditions. Consequently, friction members 18' and 20' are inactive, unlike the FIG. 1 actuator a bearing 136 composed of a suitable low friction material is carried by section 48' guides movement of assembly 12' within cylinder 10.

While three presently preferred embodiments of this invention have been illustrated and described herein, variations will become apparent to one of ordinary skill in the art. For example, the fluid pressure adjacent piston 16' could be transmitted to and sensed at a location outside of cylinder 10', rather than at diaphragm 122, so long as fluid pressure in chamber 28' is controlled in the manner described. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. A friction damper, comprising:
    a cylinder and an expandable piston assembly movable in and out of said cylinder;
    said piston assembly including a shaft, a hollow piston supported by said shaft, at least one curved friction member carried by said piston, and fluid actuator means acting between said piston and said friction member for pressing said friction member against the inside of said cylinder in response to a fluid pressure inside of said piston;
    said piston including two spaced apart parallel end walls forming a chamber facing the inside of said cylinder, and two spaced apart side walls respectively projecting from said end walls toward one another, and terminating in two spaced apart parallel edges, said edges defining a curved opening for said chamber fronting upon the inside of said cylinder;
    said fluid actuator means including a flexible actuator ring having a width greater than the spacing between said edges, said actuator ring being located radially inward of said side walls such that in response to a fluid pressure inside said piston said actuator ring simultaneously self-seals against the interior surface of said side walls and bulges outwardly through said curved opening to press said friction member against the inside wall of said cylinder when said chamber is pressurized;
    said friction member having an outline registering with said curved opening, and being contained in a fixed position with respect to said piston between said edges, the inside wall of said cylinder, and said actuator ring.

2. The damper of claim 1, wherein said fluid actuator means are further operative to control the fluid pressure within said chamber in relation to the direction of movement of said piston assembly with respect to said cylinder.

3. The damper of claim 2, wherein said fluid actuator means include a source of two different fluid pressures, and means for pressurizing said chamber (1) with one of said fluid pressures during movement of said assembly in one direction and (2) with the other of said fluid pressures during movement of said assembly in the opposite direction.

4. The damper of claim 2, wherein said friction member is made up of two independently movable sections and said chamber is divided into two separately pressurizable spaces, and wherein said fluid actuator means include means for pressurizing (1) only one of said spaces with a single fluid pressure during movement of said assembly in one direction and (2) both of siad spaces is simultaneously with said single fluid pressure during movement of said assembly in the opposite direction.

5. A friction damper, comprising:
    two telescopically movable load bearing members and frictional damping means supported by one of said load bearing members for applying a frictional damping force to the other of said load bearing members;
    said damping means including a housing, at least one curved friction member carried by said housing, and fluid actuator means acting between said housing and said friction member for pressing said friction member against said other load bearing member in response to a fluid pressure inside of said housing;

said housing including two spaced apart end walls forming a chamber facing said other load bearing member, and two spaced apart side walls respectively projecting from said end walls toward one another, and terminating in two spaced apart parallel edges, said edges defining a curved opening for said chamber fronting upon said other load bearing member;

said fluid actuator means including a flexible actuator ring having a width greater than the spacing between said edges, said actuator ring being located radially inwardly of said side walls such that in response to a fluid pressure inside said housing said actuator ring simultaneously self-seals against the interior surface of said side walls and bulges outwardly through said opening to press said friction member against said outer load bearing member when said chamber is pressurized;

said friction member having an outline registering with said curved opening, and being contained in a fixed position with respect to said one load bearing member between said edges, said other load bearing member, and said actuator ring.

6. The damper of claim 5, wherein said fluid actuator means include pressure fluid sensor means for causing said chamber to be pressurized solely during movement of said load bearing members in a predetermined direction of movement in response to a change in fluid pressure adjacent said housing.

7. The damper of claim 6, wherein said other load bearing member is a closed-ended cylinder, and said sensor means include a displaceable diaphragm exposed to fluid pressure within one end of said cylinder such that said diaphragm moves to a predetermined position only when said one load bearing member and said cylinder move in a predetermined direction with respect to one another, and a valve actuated by displacement of said diaphragm for admitting fluid pressure into said chamber only when said diaphragm assumes said predetermined position.

* * * * *

UNITED STATES PATENT AND TRADEMARK OFFICE
CERTIFICATE OF CORRECTION

PATENT NO. : 4,979,595

DATED : December 25, 1990

INVENTOR(S) : H. Neil Paton

It is certified that error appears in the above-identified patent and that said Letters Patent is hereby corrected as shown below:

In the Abstract, line 24, change "chamber," to --chamber--;

line 26, "pressure" is changed to --pressures--.

Column 9, line 9, "120" is changed to --121-.

Column 10, line 52, claim 4, "siad" is changed to --said--.

Signed and Sealed this

Twenty-fourth Day of November, 1992

Attest:

DOUGLAS B. COMER

*Attesting Officer*  *Acting Commissioner of Patents and Trademarks*